United States Patent [19]

Ogino et al.

[11] Patent Number: 4,961,030
[45] Date of Patent: Oct. 2, 1990

[54] MISS CONVERGENCE COMPENSATING DEVICE FOR PROJECTION TYPE DISPLAY

[75] Inventors: Masanori Ogino; Takeo Yamada; Miyuki Ikeda; Toshiyuki Kimoto, all of Yokohama, Japan

[73] Assignee: Hitachi, Ltd., Tokyo, Japan

[21] Appl. No.: 353,787

[22] Filed: May 18, 1989

[30] Foreign Application Priority Data

May 19, 1988 [JP] Japan .................................. 63-120554
Jul. 13, 1988 [JP] Japan .................................. 63-172773

[51] Int. Cl.$^5$ ......................... H01J 29/70; H04N 9/31
[52] U.S. Cl. ...................................... 315/368; 358/60
[58] Field of Search .............. 315/368, 370, 371, 382, 315/405, 364; 358/60

[56] References Cited

U.S. PATENT DOCUMENTS 4,551,655 11/1985 Timmermans ........................ 358/60
4,833,370 5/1989 Sakurai et al. ..................... 315/368

Primary Examiner—Gregory C. Issing
Attorney, Agent, or Firm—Antonelli, Terry, Stout & Kraus

[57] ABSTRACT

The present invention relates to a miss convergence compensating circuit of a projection type display. The projection type display is provided with three projection tubes for red, green and blue colors and a color image is obtained by combining three colors from three projection tubes on a screen. When such projection tubes are arranged slant to the screen, miss convergence is generated on the screen. A convergence yoke for auxiliary deflection of electron beam is generally provided in order to compensate for such miss convergence, but this convergence yoke has the deflection sensitivity which is worse than that of deflection yoke. Therefore, the present invention contributes to compensate for miss convergence using the deflection yokes. For this purpose, at least two deflection coils are provided with a transformer coupling which allow the compensating currents corresponding to the miss convergence compensating signals to flow. In this case, the transformer coupling is coupled so that the currents of opposite polarities are caused to flow into at least two deflection coils as the compensating currents.

18 Claims, 9 Drawing Sheets

MISS CONVERGENCE COMPENSATING DEVICE FOR PROJECTION TYPE DISPLAY

BACKGROUND OF THE INVENTION

The present invention relates to a miss convergence compensating device for a projection type display.

It is a general process in a projection type display to arrange in parallel three projection tubes for red, green and blue colors together with a projection lens and synthesize projected color images on one screen.

FIG. 1 illustrates a relationship between projection lenses and an image projected on the screen in a general projection type display.

In FIG. 1, reference numerals 200, 201, 202 designate projection lenses for three colors; 210 designates a screen and ω is gradient of blue light in relation to green light.

As shown in FIG. 1, on the occasion of projecting and synthesizing color images, the red and blue images are projected in a direction inclined to the screen and therefore a trapezoidal distortion in a vertical direction (trapezoidal distortion with a different length on two sides in the vertical direction) is generated based on the projective geometry and it causes miss convergence.

In view of compensating for such miss convergence, a convergence yoke (hereinafter abbreviated as CY) for auxiliary deflection of an electron beam similar to a deflection yoke (hereinafter abbreviated as DY) is mounted to the neck part of the projection tube and an output from the convergence amplifier is applied to CY for compensating for miss convergence.

The major factor of miss convergence resulting from such projection type optical system (projection lens, etc.) includes the vertical trapezoidal distortion (hereinafter referred to as Vertical Keystone, V-KS) and horizontal linearity distortion (hereinafter abbreviated as H-LIN).

FIG. 2 indicates a positional relationship between the projection tube and DY, CY in a general projection type display.

In FIG. 2, reference numeral 16 designates the projection tube; 17, DY; 18, CY; and 19, an electron gun.

Deflection sensitivity of DY 17, CY 18 can be expressed in terms of the deflection distance of the electron beam for a unit electromagnetic energy input and is proportional to the effective magnetic path of each yoke (longitudinal direction of the neck part).

Meanwhile, as shown in FIG. 2, the effective magnetic path length of CY 18 is about ½ of such length of DY 17 because there is a limitation on the size in order to prevent adverse effect by CY 18 on the electron lens part of the electron gun 19 which is provided adjacent to the left side of CY 18.

Therefore, the deflection sensitivity of CY 18 is as bad as about ½ in comparison with DY 17.

As described above, the deflection sensitivity of CY is as bad as about ½ that of DY and miss convergence compensation is carried out by CY in the prior art, resulting in a problem that a large amount of electrical power is consumed for compensation of miss convergence.

The applicant of the present invention has the following three U.S. patents and patent applications in total regarding miss convergence compensation of projection type display. The former two patents relate to improvement of the deflection yoke itself and the latter application relates to a measure for saturation of an output amplifier.

U.S. Pat. No. 4,420,734
U.S. Pat. No. 4,433,318
U.S. Ser. No. 084,125 (Aug. 12, 1987) now U.S. Pat. No. 4,814,671

SUMMARY OF THE INVENTION

It is an object of the present invention to provide a miss convergence compensating circuit which solves problems of the prior art and compensates for miss convergence with less power consumption.

The present invention is constituted by a transformer coupling which receives a miss convergence compensating signal and applies a compensating current corresponding to the output signal at least to two deflection coils among a plurality of deflection coils. Particularly, this transformer coupling means is coupled to apply currents of the same magnitude and opposite polarities as the compensating currents at least to the two deflection coils.

In general, a current from the one power source flows also into the other power source if it is attempted to allow the currents from two different power sources to flow into a single load. Thereby power consumption increases in both power sources. In the present invention, as described above, since the transformer coupling is coupled so that the currents of opposite polarities are applied as the compensating currents to at least two deflection coils, the compensating current does not flow into a deflection current supply which supplies a deflection current to the deflection coils. Moreover, since the deflection current supply applies the in-phase deflection current to the deflection coils, the deflection current does not flow into the amplifier through the transformer coupling. Accordingly, power consumption does not increase in the deflection current supply nor in the amplifier.

Also, according to the present invention, since miss convergence between three original colors resulting from the projection type optical system can be compensated by the deflection coil of DY having such excellent deflection sensitivity as twice as that of CY, the electrical power to be consumed for compensation can be reduced almost to the half of that of prior art.

In addition, the present invention also includes a power amplifier which amplifies an output signal of the miss convergence signal generator and a high frequency matching circuit which receives the signal output from the power amplifier and allows passing of the high frequency element including the horizontal scanning frequency component of such output signal and supplies it to the miss convergence compensating coils. Moreover, the present invention includes a low frequency matching circuit in parallel to the high frequency matching circuit, which receives the signal output from the power amplifier, allows passing of the low frequency component including the DC component contained in such output signal and supplies it to the convergence compensating coils.

DETAILED DESCRIPTION OF THE PREFERRED EMBODIMENT

Figure 3:
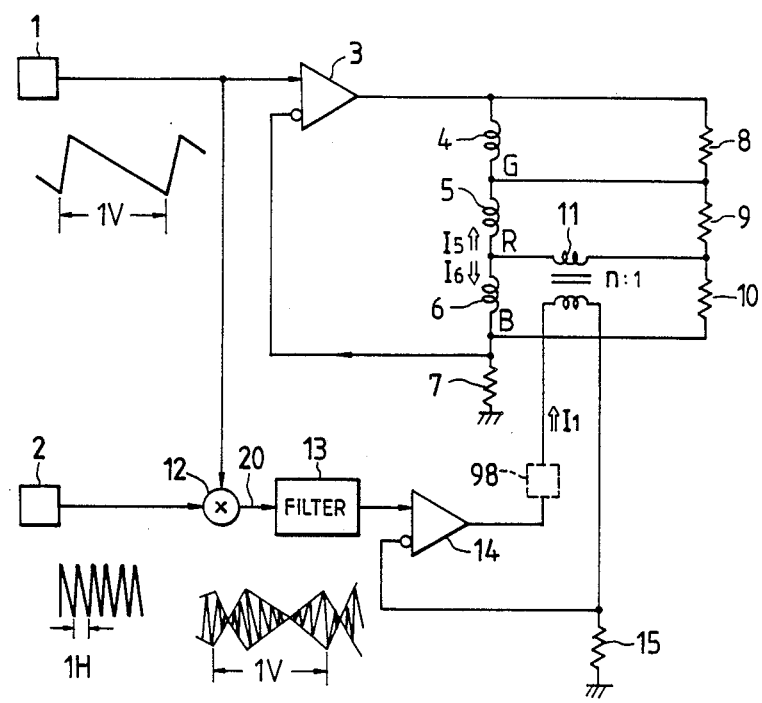
FIG. 3 is a circuit diagram showing a first embodiment of the present invention.

FIG. 3 shows a first embodiment of the present invention. This embodiment corresponds to a miss convergence compensating circuit for compensating V-KS distortion described previously.

In FIG. 3, reference numeral 1 designates a 1V (one vertical scanning period) sawtooth wave signal generator; 2, a 1H (one horizontal scanning period) sawtooth wave signal generator; 3, a feedback amplifier for vertical deflection; 4, 5, 6, vertical deflection coils of a deflection yoke (DY) for green (G), red (R) and blue (B); 7, a deflection current detection resistor for feedback; 8, 9, 10, parallel resistors of DY for green, red and blue (particularly, 9, 10 are used for differential application of a miss convergence compensating signal); 11, a transformer; 12, a multiplier; 13, a filter; 14, a feedback amplifier for miss convergence compensation; 15, a compensating current detection resistor; 20, a output signal of the multiplier 12. The high frequency matching circuit 98 will be explained later.

Next, operations of the embodiments are explained hereunder.

The 1V sawtooth wave signal to be input to the amplifier 3 and multiplier 12 and the 1H sawtooth wave signal to the input to the multiplier 12 are well known signals generated and used in the general projection type display of the prior art.

The amplifier 3 supplies the vertical deflection current to the vertical deflection coils 4, 5, 6 and makes feedback operation so that the waveform of vertical deflection current detected by the detection resistor 7 becomes smaller to the input 1V sawtooth wave signal. Here, the parallel resistors 8, 9, 10 are set to mutually equal value higher than about 10 times that of the parasitic resistance of the vertical deflection coils 4, 5, 6.

Meanwhile, the multiplier 12 generates a miss convergence compensating signal by multiplying the input signals of 1V sawtooth wave signal generator 1 and the 1H sawtooth wave signal generator 2 and also forms the miss convergence compensating signal generator with the sawtooth wave generators 1, 2. Here, the frequency component of the miss convergence compensating signal is composed of the horizontal scanning period component of high frequency and the side bands thereof. Next, this miss convergence compensating signal is input to the amplifier 14 through the filter 13 to compensate for frequency characteristics of the successive stages.

The amplifier 14 supplies a compensating current to the primary side (lower side in FIG. 3) of the transformer 11 and makes feedback operation so that the compensating current waveform detected by the detection resistor 15 becomes similar to the miss convergence compensating signal waveform input from the filter 13.

The transformer 11 applies a compensating current supplied to the primary side to the vertical deflection coils 5, 6 from the secondary side (upper side in FIG. 3).

Here, since the vertical deflection current supplied from the amplifier 3 flows through the vertical deflection coils 4, 5, 6 in the same phase, any current does not flow into the primary side of the transformer 11 and thereby a current does not flow into the amplifier 14.

Meanwhile, the compensating current supplied through the transformer 11 from the amplifier 14 flows into the vertical deflection coils 5, 6 in opposite polarity and therefore a current does not flow into the amplifier 3. Namely, the amplifiers 3, 14 operate independently keeping orthogonality (namely, signals do not leak to each other).

In general, when it is attempted to apply respectively current from two different power sources to one load, a current from the one power source flows also into the other power source and power consumption increases at both power sources. However, in this embodiment, the vertical deflection current supplied from the amplifier 3 does not flow into the amplifier 14 as described above, and since the compensating current supplied from the amplifier 14 does not flow into the amplifier 3, power consumption does not increase in the amplifiers 3, 14.

Moreover, according to the embodiment, since miss convergence compensation can be realized with the vertical deflection coil of DY having about two-fold deflection sensitivity in comparison with that of CY, the power to be consumed for such miss convergence compensation can be reduced to about ½ of the prior art.

As the final explanation of this embodiment, a structure of the filter 13 is briefly described hereunder.

When the compensating current flowing into the primary side (lower side in FIG. 3) of the transformer 11 from the amplifier 14 is defined as $I_1$ and compensating currents flowing into the vertical deflection coils 5, 6 resulting from such current as $I_5$, $I_6$, the following relationship can be obtained.

$$I_5 = I_6 \approx \frac{pMI_1}{2pL_2 + R_0 + pL_D} \quad 1$$

where,
  $p = j\omega$ (complex angular frequency)
  M = mutual inductance of transformer 11
  $L_2$ = secondary inductance of transformer 11

$R_0$=resistance value of parallel resistors 9 and 10
$L_D$=inductance of vertical deflection coils 4, 5, 6
The formula 1 can be transformed as follow.

$$\frac{I_5}{I_1} \approx \frac{M}{2L_2 + L_D} \times \frac{1}{1 + \frac{1}{\tau p}} \quad 2$$

where, $$\tau = \frac{2L_2 + L_D}{R_o}$$

The second item of right side of formula 2, namely $1/(1+1/\tau p)$ represents the frequency characteristic.

Figure 4:
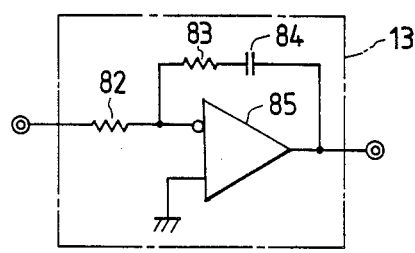
FIG. 4 is a circuit diagram showing a practical example of a filter 13 in FIG. 3.

FIG. 4 shows a circuit diagram showing a practical example of the filter 13 in FIG. 3.

In FIG. 4, 82, 83 designate resistors, 84, a capacitor and 85, an operational amplifier.

The frequency characteristic described above can be compensated by constituting the filter 13 in FIG. 3 with the operational amplifier 85 shown in FIG. 4 and setting the time constant to a value so that the relationship, $R_1=R_2$, $R_2C_2=\tau$ when resistance values of resistors 82, 83 are respectively R1 and R2 and the capacitance of capacitor 84 is $C_2$.

The actual example of constants for the vertical scanning frequency of 60 Hz is indicated below. $R_D$ is a resistance value of a parasitic resistance of vertical deflection coils 4, 5, 6 and $R_2$ is a resistance value of a detection resistor 15.

$L_D = 2$ mH, $R_D = 4\Omega$, $R_0 = 100\Omega$, $L_2 = 5$ mH, $M = 500$ μH, $R_1 = R_2 = 1$ kΩ, $C_2 = 120$ nF, $R_3 = 5\Omega$, The first embodiment of the present invention has been explained above. Next, a second embodiment of the present invention is shown in FIG. 5.

Figure 5:
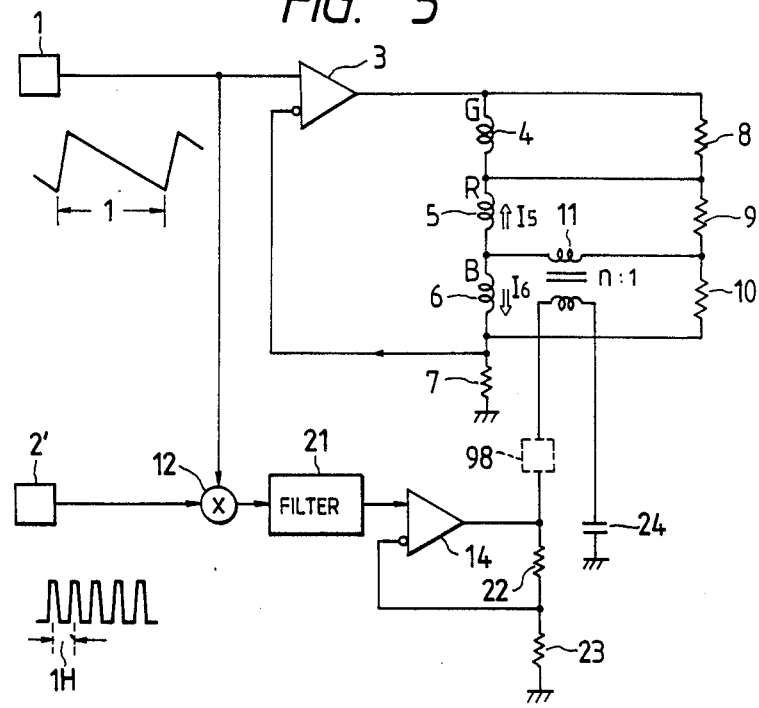
FIG. 5 is a circuit diagram showing a second embodiment of the present invention.

In FIG. 5, the same constituents as those in FIG. 3 are given the same reference numerals. Moreover, 2' is a signal generator which generates a signal obtained by differentiating the 1H sawtooth wave signal 2 shown in FIG. 3. 21 is a filter, 22, 23 are bleeder resistors for voltage detection and 24 is a DC cut-off capacitor.

In the embodiment in FIG. 3 described previously, the amplifier 14 employs a so-called current feedback system in which a negative feedback operation is carried out so that the waveform of the output current (namely, the compensating current) becomes similar to the waveform of the miss convergence compensating signal, but in this embodiment, the amplifier 14 employs a so-called a voltage feedback system in which the negative feedback is carried out so that the waveform k of the output voltage (namely, the compensating voltage) becomes similar to the waveform of the miss convergence compensating signal.

Namely, in this embodiment of the present invention, the amplifier 14 applies the compensating voltage to the primary side of transformer 11 and makes the negative feedback operation so that the waveform of the compensating voltage detected by the bleeder resistors 22, 23 becomes similar to the waveform of the miss convergence compensating signal input from the filter 21.

Moreover, in this embodiment, when an output voltage of the amplifier 14 (namely, a compensating voltage) is defined as $E_1$, the resultant compensating currents $I_5$, $I_6$ flowing into the vertical deflection coils 5, 6 are expressed by the following formula.

$$I_5 = I_6 = \frac{\frac{n}{pL_D} \cdot \frac{1}{1 + R_o/pL_D}}{1 + \frac{1}{p^2LC}} \quad 3$$

where,
n=winding ratio of transformer 11
L=virtual equivalent inductance viewed from the primary side of transformer 11 and is almost equal to $L_D/(2n^2)$
C=capacitance value of capacitor 24

The first item of the numerator on the right side of above formula 3, namely $n/pL_D$ is an integral factor of vertical deflection coil inductance and it is compensated, as shown in FIG. 5, by applying the pulse signal 2' obtained by differentiating the 1H sawtooth wave signal shown in FIG. 3 as the one input of the multiplier 12.

Meanwhile, the second item of the denominator on the right side of formula 3, namely $1/P^2LC$ can be neglected when a value of $\sqrt{LC}$ is selected sufficiently larger than the one horizontal scanning period (1H).

Moreover, the second item of the numerator on the right side of formula 3, namely $1/(1+R_0/pL_D)$ is the same, although different in the time constant value, as the second item on the right side of formula 2, namely $1/(1+1/\tau p)$. Therefore, it can also be compensated by constituting the filter 21 in the same type as that in FIG. 4.

Other operations of this embodiment are not explained here because these are the same as the operations in the embodiment in FIG. 3.

Therefore, this embodiment provides the similar effect as the embodiment in FIG. 3 described above.

The embodiment in FIG. 5 has been described above.

Next, as the third embodiment of the present invention, a miss convergence compensating circuit for compensating the H-LIN distortion described will be explained.

Figure 6:
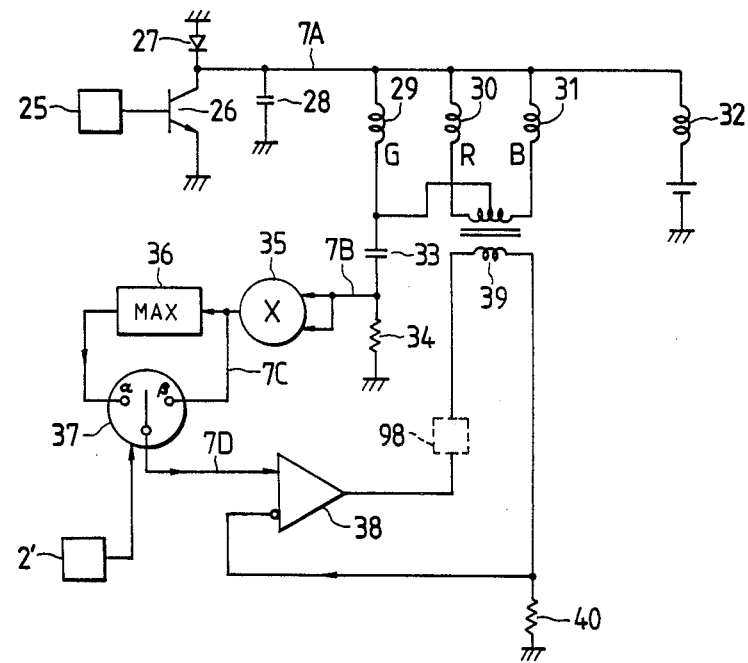
FIG. 6 is a circuit diagram showing a third embodiment of the present invention.

The third embodiment of the present invention is shown in FIG. 6.

In FIG. 6, the reference numeral 25 designates a horizontal drive pulse generator; 26, a horizontal output transistor; 27, a damper diode; 28, a resonant capacitance; 29, 30, 31, a horizontal deflection coil of DY for green, red and blue; 32, a choke coil for power supply; 33, a DC cut-off bypass capacitor; 34, a deflection current detecting resistor; 35, a multiplier; 36, a maximum value detector; 37, a changeover switch; 38, a negative feedback amplifier; 39, a tansformer; and 40, a compensating current detection resistor. The constituents other than 35 and 40 belong to the well known horizontal deflection output circuit technique.

FIGS. 7A–7D show the waveforms of signals at the major points in FIG. 6.

FIGS. 7A, 7B, 7C, 7D respectively show signal waveforms in FIG. 6 and BL is the horizontal flyback time.

Figure 7A:
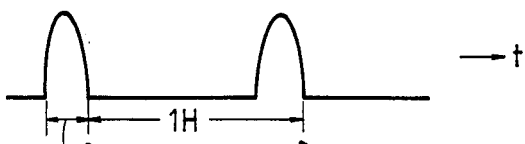
FIGS. 7A–7D illustrate signal waveforms at the major points in FIG. 6.

Operations of this embodiment are explained. The horizontal output transistor 26 receives the pulse sent from the horizontal drive pulse generator 25 and enters the ON state in the latter half period of the horizontal scanning period depending on such input. Moreover, the resonant capacitance 28 resonates with the inductance component of the horizontal deflection coils 29, 30, 31 during the horizontal flyback time and generates a flyback pulse as shown in FIG. 7A and the horizontal deflection current of sawtooth wave flows into the horizontal deflection coils 29, 30, 31.

Figure 7B:
Figure 7C:

This horizontal deflection current is detected by the detection resistor 34 to obtain the sawtooth wave signal shown in FIG. 7B. It is then input to the multiplier 35. The multiplier 35 squares the input sawtooth wave signal, outputs a parabolic signal as shown in FIG. 7C to be input to the maximum value detector 36 and to one input of the changeover switch 37. For instance, the maximum value detector 36 is formed of a diode and a capacitor to detect the maximum value of the input parabolic signal and input it to the other input of the changeover switch 37.

The changeover switch 37 is controlled for its changeover operation by the input pulse signal 2' shown in FIG. 5, sets the switch to the $\alpha$ side only during the horizontal flyback period and to the $\beta$ side during the other period. Therefore, as the output, the signal of the waveform shown by a solid line in FIG. 7D can be obtained. The signal output from the changeover switch 37 is input to the amplifier 38 as the miss convergence compensating signal.

The amplifier 38 supplies the compensating current to the primary side (lower side in FIG. 6) of the transformer 39 and makes the negative feedback operations so that the waveform of the compensating current detected by the detection reistor 40 becomes similar to the waveform of the miss convergence compensating signal input from the changeover switch 37.

Figure 7D:

Here, the signal like that obtained by making flat the horizontal flyback period indicated by a solid line in FIG. 7D is used as the miss convergence compensating signal because of the reasons explained below.

Namely, if a signal showing a sharp change of waveform as shown in FIG. 7C is used intact as the miss convergence compensating signal, a current showing a sharp change of waveform is also input to the transformer 39 as the input current. However, since the transformer 39 has an inductive load, an excessive voltage is necessary if the current showing such a sharp change of waveform is input and therefore the amplifier 38 requires high power supply voltage and power consumption becomes excessive.

The transformer 39 applies the compensating current of opposite polarity to the horizontal deflection coils 30, 31 as in the case of embodiment in FIG. 3 explained previously. In the case of the embodiment in FIG. 3 described previously, three vertical deflection coils have been connected in series, but in this embodiment, three horizontal deflection coils are connected in parallel and therefore a dual circuit structure has been employed.

Moreover, since the horizontal deflection currents described previously flow in-phase condition into the horizontal deflection coils 29, 39, 31, no voltage difference is generated on both ends of the secondary side of transformer 39.

Therefore, the effect similar to that of embodiment shown in FIG. 3 can also be attained in this embodiment.

The actual example of constants, in such a case that a super high precision display having the horizontal scanning frequency of about 64 kHz is used as the projection type display in this embodiment, is indicated below.

$L_D$ is an inductance of horizontal deflection coils 29, 30, 31; $C_r$, a capacitance value of resonant capacitor 28; $C_3$, a capacitance value of bypass capacitor 33; $L_1$, an inductance of primary side of transformer 39; $L_2$, inductance of secondary side of transformer 39; $R_0$, resistance value of the detection resistor 40.

$$L_D = 200 \text{ }\mu\text{H}, C_r = 4 \text{ m}\mu\text{F},$$
$$C_3 = 0.4 \text{ }\mu\text{F}, L_1 = 20 \text{ }\mu\text{H},$$
$$L_2 = 2 \text{ mH}, R_0 = 0.5\Omega$$

Moreover, this embodiment is capable of compensating influence of parasitic loss of DY with the method described above by arranging a filter in the same structure as shown in FIG. 4 on the input side of amplifier 38.

It is also obvious that as an embodiment of this embodiment, an example of employing the voltage feedback system to the amplifier 38 can be realized like the relationship of the embodiment in FIG. 5 to the embodiment in FIG. 3.

Regarding the above three embodiments, the method of differential drive of DY for red and blue colors has been explained. Moreover, the differential drive of DY for green and red colors is also possible by adding the similar circuit. In addition, it is possible to employ the method of differential drive for two pairs of DY for green and red colors and DY for green and blue colors in place of the DYs mentioned above.

The miss convergence compensating circuit for compensating V-KS distortion, H-LIN distortion which are major factors of miss convergence resulting from projection type optical system (projection lens, etc.) has been explained above.

Here, a distortion in such a type that three primary colors are deviated in parallel due to directional fluctuation of projection type optical system or of an electron gun within the projection tube can also be considered as the factor of miss convergence in addition to the V-KS distortion and H-LIN distortion described previously. In the prior art, a method of applying the compensating current such as a DC current to CY has been employed. However, as described previously, since CY has bad deflecton sensitivity, it shows considerable power consumption required for compensation.

Therefore, the miss convergence compensating circuit, which can compenste for not only the H-LIN distortion described above but also the distortion in such a type that the three primary colors are deviated in parallel, will be explained as the fourth embodiment of the present invention.

Figure 8:
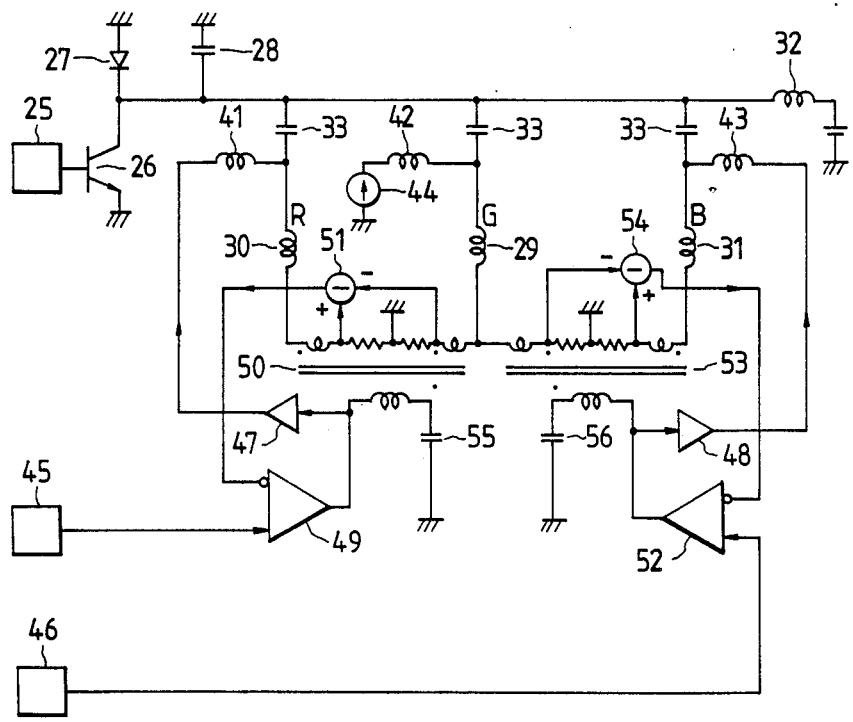
FIG. 8 is a circuit diagram showing a fourth embodiment of the present invention.

FIG. 8 is the fourth embodiment of the present invention. In FIG. 8, the same elements as those in FIG. 6 are designated by like reference numerals. In addition, 41, 42, 43 a choke coil; a, variable power supply for parallel shift in the horizontal direction of green image; 45, a first miss convergence compensating signal generator; 46, a second miss convergence compensating signal generator; 47, 48, a low frequency amplifier; 49, a negative feedback amplifier; 50, 53, a transformer; 51, 54, a subtractor; 55, 56, a DC cut-off capacitor.

Operations of this embodiment are explained hereunder.

In this embodiment, is employed a system for differential drive of the DY for green and red colors and DY for green and blue colors.

To the amplifier 49, a signal for shifting in parallel in the horizontal direction the red image with reference to the green image and a signal for compensating H-LIN distortion are applied as the first miss convergence compensating signal 45, while to the amplifier 52, a signal for shifting in parallel in the horizontal direction the blue image with reference to a blue green image and a signal for compensating H-LIN distortion is applied as the second miss convergence compensating signal 46.

Therefore, the amplifier 49 supplies the compensating signal to the amplifier 47 and the primary side of transformer 50 and makes negative feedback operation so that the waveform of the output voltage of subtractor 51 becomes similar to the waveform of the first convergence compensating signal 45. Moreover, the amplifier 52 supplies the compensating current to the amplifier 48 and the primary side of transformer 53 and makes negative feedback operation so that the waveform of the output voltage of subtractor 54 becomes similar to the waveform of the second miss convergence compensting signal 46.

On the other hand, the variable power supply 44 is used for parallel shift in the horizontal direction of the green image and controls a current flowing into the horizontal deflection coil 29 of DY for green color.

Each inductance of choke coils 41, 42, 43 is respectively selected to an AC high impedance which is about 20 times of each inductance of horizontala deflection coils 29, 30, 31. Therefore, a high frequency current of the horizontal scanning period, namely a signal component for compensating the H-LIN distortion, among the compensating currents supplied from the amplifiers 47, 48 flows a little respectively into choke coils 41, 43 but a DC current and a low frequency current of vertical scanning period, namely a signal component for parallel shift in the horizontal direction of image flows sufficiently. Moreover, a DC current and low frequency current of vertical scanning period among the currents supplied from the variable power supply 44 flows sufficiently to the choke coil 42.

As a result, a DC current and low frequency current of vertical scanning period, namely the signal components for parallel shift in the horizontal direction of image are respectively supplied to the horizontal deflection coils 29, 30, 31 of DY to conduct the parallel shift in the horizontal direction of a green image and parallel shift in the horizontal direction of a red image and a blue image with reference to the green image with a low power loss.

The transformer 50 supplies the compensating current supplied to the primary side to the horizontal deflection coils 29, 30 of DY for green color and DY for red color from the secondary side thereof in the mutually opposite polarities, while the transformer 53 supplies the compensating current supplied to the primary side to the horizontal deflection coils 29, 31 of DY for green color and DY for blue color from the secondary side thereof in the mutually opposite polarities.

The horizontal deflection currents flow in-phase through the horizontal deflection coils 29, 30, 31 like the embodiment shown in FIG. 6 described previously.

Here, since the secondary sides of transformers 50, 53 are respectively wound by a couple of windings and the winding on such a side to be connected to the horizontal deflection coil 29 of DY for green color allows currents of a half value to flow, a number of turns on this side is doubled to the number of turns of the winding on the other side. Moreover, a pair of resistors arranged between both windings are current detection resistors and the resistance values are also set to the ratio of 1:2.

Thereby, the horizontal deflection currents flowing in the in-phase condition through the horizontal deflection coils 29, 30, 31 do not allow a voltage to be generated at the output of subtractors 51, 54 and on the contrary only the compensating current flowing in the reverse phase allows a voltage to be generated. Accordingly, the compensating current can be detected with the current detection resistors of transformers 50, 53 and subtractors 51, 54 and the negative feedback operations of amplifiers 49, 52 described above can be realized. Horizontal deflection currents flowing in the in-phase condition through the horizontal deflection coils 29, 30, 31 do not generate any voltage difference even at both ends on secodary sides of the transformers 50, 53.

As described above, according to this embodiment, not only the H-LIN distortion but also the distortion in such a type that the three primary colors are shifted in parallel in the horizontal direction can be compensated by DY as the miss convergence compensation. Therefore, every auxiliary horizontal deflection coil out of CY can be eliminated.

Next, as the fifth embodiment of the present invention, a miss convergence compensating circuit, which can compensate not only the V-KS distortion described above but also the the distortion in such a type that the three primary colors are deviated in parallel in the vertical direction, will then be explained hereunder.

Figure 9:
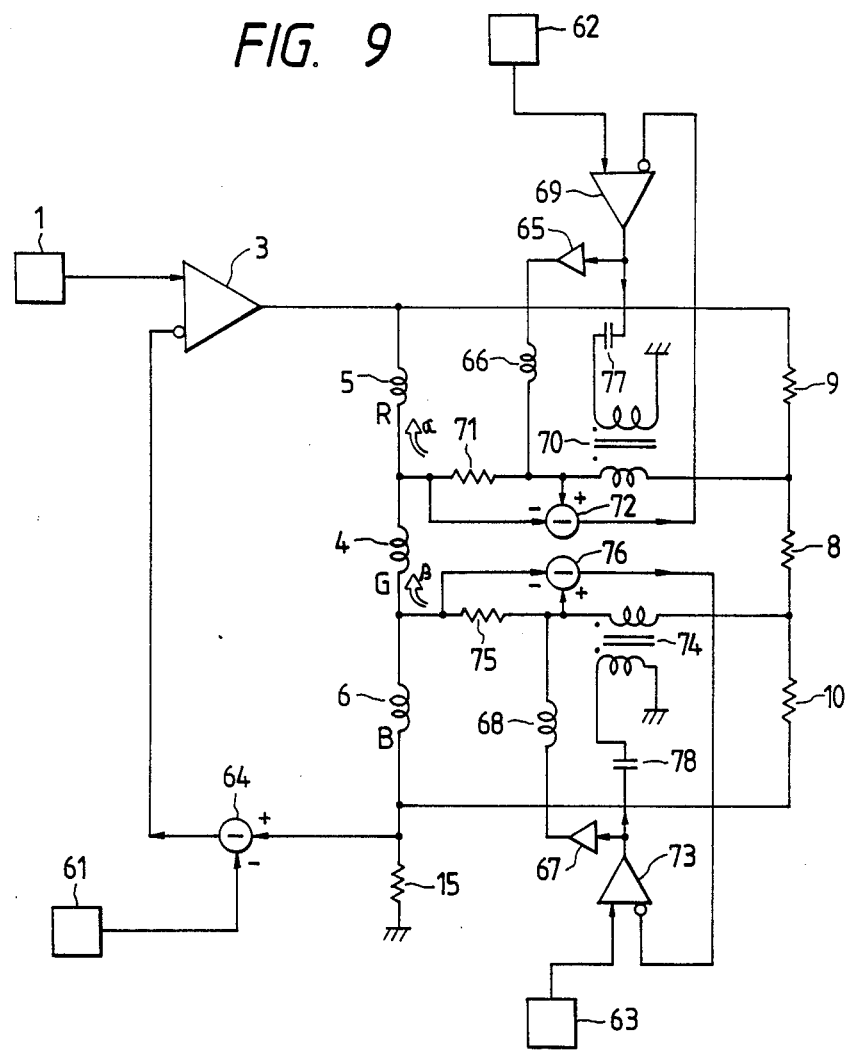
FIG. 9 is a circuit diagram showing a fifth embodiment of the present invention.

FIG. 9 shows the fifth embodiment of the present invention.

In FIG. 9, the same constituents as those in FIG. 3 are given the same reference numerals. In addition, 61 is a first miss convergence compensating signal generator; 62, a second miss convergence compensating signal generator; 63, a third miss convergence compensating signal generator; 64, a subtractor; 65, 67, a low frequency amplifier; 66, 68, a choke coil; 69, 73, a negative feedback amplifier; 70, 74, a transformer; 71, 75, a current detection resistor; 72, 76, a subtractor; 77, 78, a DC cut-off capacitor.

Operations of this embodiment are explained hereunder.

In this embodiment, is employed the system of differential drive for two pairs of DYs for green and red colors and DYs for green and blue colors.

When a signal (low frequency signal) for shifting in parallel a green image in the vertical direction (substantially, shifting in parallel the total images of three primary colors in the vertical direction) is supplied to the subtractor 64, as the first miss convergence compensating signal 61, the feedback voltage of the amplifier 3 is reduced as much as such signal. Therefore, the in-phase current corresponding to the first miss convergence compensating signal flows into the vertical deflection coils 4, 5, 6 of DY with the effect of amplifier 3 and the parallel shift of the image of three primary colors in total can be attained. Even when a high frequency signal is supplied to the subtractor 64 as the first miss convergence compensating signal 61, the amplifier 3 does not work effectively since this amplifier deals with the signal of as low frequency as about 60 Hz.

Meanwhile, to the amplifier 69, a signal for shifting in parallel the red image in the vertical direction and a signal for compensating V-KS distortion are input as the second miss convergence compensating signal 62, while to the amplifier 73, a signal for shifting in parallel the red image in the vertical direction and a signal for compensating V-KS distortion are input as the third miss convergence compensating signal 63.

Therefore, the amplifier 69 supplies a compensating signal to the amplifier 65 and capacitor 77 and makes negative feedback operation so that the waveform of output voltage of subtractor 72 becomes similar to the waveform of the second miss convergence compensating signal 62. In addition, the amplifier 73 also supplies the compensating current to the amplifier 67 and capacitor 78 and makes a negative feedback operation so that the waveform of output voltage of subtractor 76 becomes similar to the waveform of the third miss convergence compensating signal 63.

Regarding the compensating current supplied to the amplifier 65, only the DC current and low frequency current of vertical scanning period (namely, signal component for shifting in parallel the red image in the vertical distortion) are extracted and thereafter the compensating signal flows into the vertical deflection coil 5 of DY for red color to make positive the polarity of arrow mark α. It is because a constant current always flows, as described above, in the opposite direction of arrow mark α by the negative feedback operation of the amplifier 3. Thereby, only the red image can be shifted in parallel in the vertical direction for the green and blue images.

Also, regarding the compensating current supplied to the amplifier 67, only the DC current and low frequency current of vertical scanning period (namely, the signal component for shifting in parallel the blue image in the vertical direction) are extracted from a choke coil 68 and thereafter signals flow through the vertical deflection coil 4 of DY for green color and the vertical deflection coil 5 of DY for red color to make positive the direction of arrow mark β. Thereby, the green image and red image are shifted in parallel in the vertical direction in relation to the blue image. For example, since the parallel shift of the green image and red image to the upper side by a constant amount in relation to the blue image is equivalent to the parallel shift to the lower side by such amount of the blue image in relation to the green and red images, only the blue image can be shifted in parallel in the vertical direction in relation to the green and red images.

Moreover, only a high frequency current of horizontal scanning period (namely, a signal component for compensating V-KS distortion) of the compensating current supplied to the capacitors 77, 78 passes therethrough and is supplied to the primary sides of the transformers 70, 74 respectively. The successive operations are the same as those in the embodiment shown in FIG. 3 described above.

As described above, according to this embodiment, not only the V-KS distortion but also the distortion in such a type that three primary colors are shifted in parallel in the vertical direction can be compensated as the compensation for miss convergence. Therefore, the coil used for auxiliary vertical deflection among CY can be eliminated perfectly.

Figure 1:
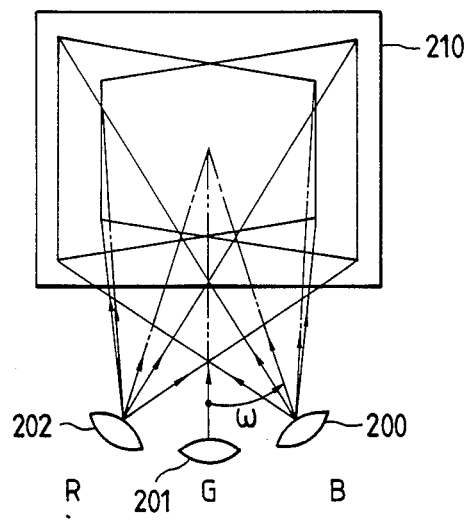
FIG. 1 illustrates a relationship between a projection lens and an image projected on the screen in a general projection type display.
Figure 2:
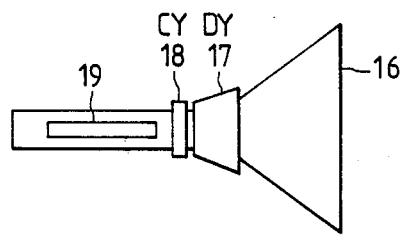
FIG. 2 is a side elevation showing a positional relation of a projection tube, DY, CY in a general projection type display.

Meanwhile, use of both this embodiment and the embodiment shown in FIG. 8 described previously realizes compensation for miss convergence by the currents of all frequency bands required (DC current and low frequency current during the vertical scanning period and high frequency current during the horizontal scanning period). In this case, CY itself can be eliminated. Therefore, not only power consumption can be reduced but also the magnification factor of an electron lens can be made small and focus can be improved by changing the structure itself of the projection tube shown in FIG. 2 so as to bring an electron gun closer to the DY side.

An example of actual constants in the embodiment in FIG. 9 is indicated below. The vertical deflection coils 4, 5, 6 (2 mH), parallel resistors 8, 9, 10 (100Ω), detection resistor 15 (2Ω) and transformers 70, 74 are same as those in the embodiment in FIG. 3 described above. Moreover, the current detection reistors 71, 75 have 8Ω, choke coils 66, 68 have 20 mH and DC cut-off capacitors 77, 78 have 5 μF.

Figure 10:
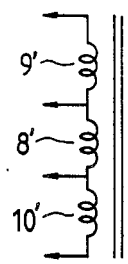
FIG. 10 is a circuit diagram showing a choke coil used in place of parallel resistors 8 10 in FIG. 9.

The parallel resistors 8, 9, 10 in FIG. 9 may be replaced with three choke coils 8', 9', 10' electromagnetically coupled with each other in FIG. 10. When the constant value is set to 30 mH, which is about five-fold of total value of 6 mH of the vertical deflection coils 4, 5, 6, branching loss of vertical deflection current of the in-phase component can be suppressed to about 20%. Meanwhile, regarding the high frequency compensating current, the opposite polarity currents flow into the choke coils 9', 10' and the magnetic fluxes are cancelled with each other, thereby the compensating currents may be effectively applied to the vertical deflection coils 5, 6.

Figure 11:
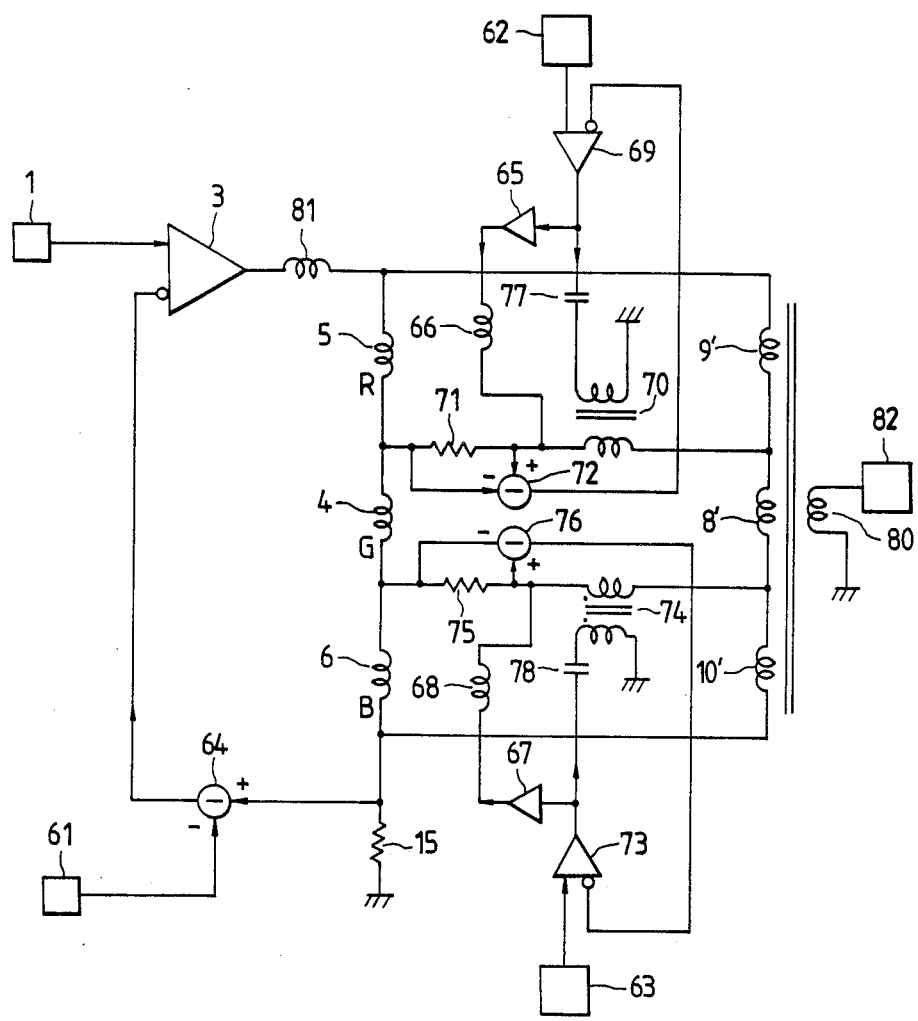
FIG. 11 is a circuit diagram showing a sixth embodiment of the present invention.

FIG. 11 shows a sixth embodiment of the present invention. In FIG. 11, the same constituents as those in FIG. 9 and FIG. 10 are given the same reference numerals. In addition, a constituent 80 designates a coil forming a choke transformer together with choke coils 8', 9', 10' and 81 is a choke coil.

An upper and lower pin-cushion distortion compensating signal output from the upper and lower pin-cushion distortion compensating amplifier 82 is applied to the coil 80.

Here, the upper and lower pin-cushion distortion means a raster type distortion common to three primary colors which is not directly related to the distortion as the factor of miss convergence relating to the present invention, in which the four corners of an image look like being over-deflected respectively toward the diagonal corners.

This distortion can be compensated by applying certain in-phase compensating currents described above to the vertical deflection coils 4, 5, 6 through the choke coils 8', 9', 10' forming a choke transformer.

Here, a certain compensating current means a current having a waveform obtained by multiplying the 1H parabolic signal shown in FIG. 7D by 1V sawtooth wave signal 1 shown in FIG. 3 by means of a multiplier provided separately.

The choke coil 81 is provided for preventing backward flow of upper and lower pin-cushion distortion compensating current to the side of amplifier 3 and has a capacitance value of about 12 mH.

Figure 12:
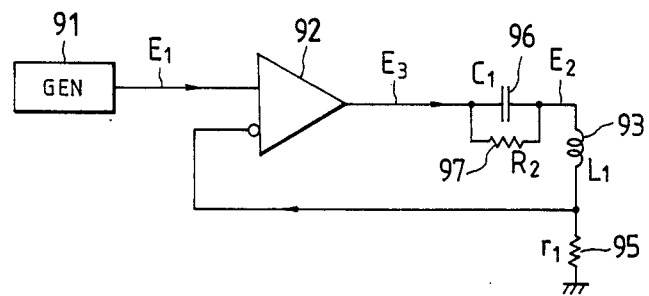
FIG. 12 is a circuit diagram showing a seventh embodiment of the present invention.

FIG. 12 shows a seventh embodiment of the present invention. In the same figure, 91 designates a compensating voltage generating circuit (GEN). In this section, the multiplier (12 in FIG. 3) multiplies the sawtooth wave (2 in FIG. 3) of horizontal period by the sawtooth wave (1 in FIG. 3) of vertical period to obtain a synthetic compensating wave. 92 designates a power amplifier. 93, a converence compensating coil; 95, a current detecting resistor for detecting and negatively feeding back the coil current; 96, a newly added capacitor; 97, a resistor for acquiring finite DC loop gain. Moreover, only the essential parts are indicated by omitting the general projector constituents from the figure.

In this embodiment, a small peak-to-peak value (hereinafter referred to as pp value) output from the power amplifier 92 is sufficient in application of a coil current like the prior art owing to the series resonance of the capacitor 96 and inductor of coil 93.

Here, a current output from the power amplifier 92 is separated according to its frequency, at the boundary of 2 kHz, in the horizontal scanning frequency (53 kHz in this embodiment) and harmonic components thereof (namely, high frequency component), vertical scanning frequency (60 Hz in this embodiment) and harmonic components thereof (namely, low frequency components corresponding to the frequency region less than about 1 kHz) and the current including the DC components and low frequency components is supplied to the coil 93 through the resistor 97 and the current of high frequency component is supplied to the coil 93 through the capacitor 96.

That is, the power supply voltage to be supplied to the power amplifier 92 can be lowered by reducing the pp values of voltages of high frequency components among the output voltages from the power amplifier 92 through the series resonance of capacitor 96 and inductor of coil 93 described above.

The process will be explained more practically. In FIG. 12, when elements 93, 95, 96, 97 have the values $L_1$, $r_1$, $C_1$, $R_2$ respectively, the practical value example is as follow in case the horizontal scanning frequency is about 53 kHz.

$L_1 = 30$ μH, $r_1 = 1 \Omega$,
$C_1 = 0.3$ μF, $R_2 = 30 \Omega$,

Voltage gain of power amplifier 92 is about x100

A concept of selecting values of $C_1$ and $R_2$ will be explained hereunder.

First, when $R_2$ is infinite, the waveforms of respective sections are shown qualitatively in FIGS. 13A to 13D. The solid line in FIGS. 13A to 13D corresponds to the scanning on the upper part of an image, while the dotted line to the scanning on the lower part of the image.

Figure 13A:
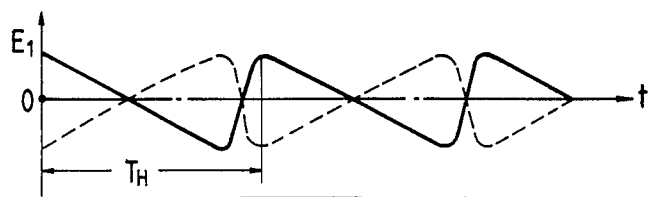
FIGS. 13A–FIG. 13D illustrate waveforms showing voltage waveforms of major points in FIG. 12.
Figure 13B:
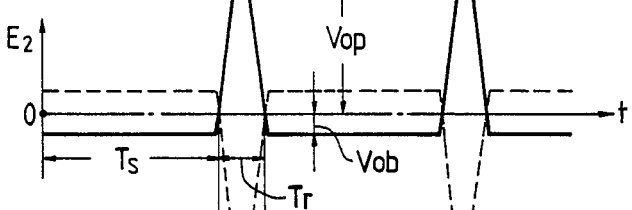

In FIG. 13A, $E_1$ corresponds to an output voltage $E_1$ of power amplifier 92 in FIG. 12 and the waveform of this voltage is similar to the waveform of current flowing through the current detection resistor 95 ($r_1$), coil 93 ($L_1$) and capacitor 96 ($C_1$) on the basis of the negative feedback operation. Corresponding to $E_1$, the potential $E_2$ (potential difference across both ends of the current detecting resistor 95 may be neglected) at the connecting point of the coil 93 ($L_1$), capacitor 96 ($C_1$) and resistor 97 ($R_2$) has the waveform shown in FIG. 13B. In FIG. 13B, $V_{0p}$ is an amplitude value higher than 0 V, while $V_{0b}$, an amplitude value lower than 0 V.

Figure 13C:
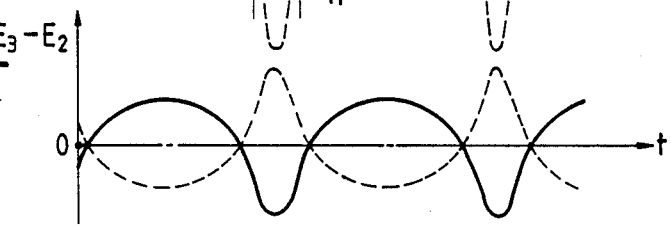
Figure 13D:
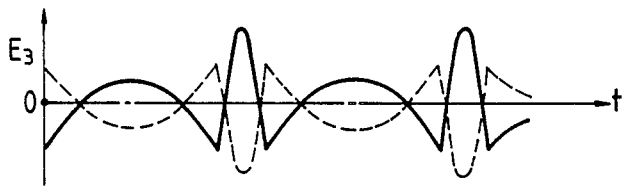

Moreover, a potential difference between both ends of capacitor 96 ($C_1$) in FIG. 12 is expressed by $E_3-E_2$ and its waveform is shown in FIG. 13C. It can be obtained by integrating the waveform of $E_1$. Finally, the waveform of output voltage $E_3$ of power amplifier 92 may be obtained from $E_2+(E_3-E_2)$ as shown in FIG. 13D. Comparison of FIG. 13D with FIG. 13B obviously shows that the pp value of $E_3$ is reduced to about a half of the pp value of $E_2$.

Therefore, under the condition that the same coil current is applied, the power supply voltage covering the pp value of $E_2$ has been required in the prior art but only the power supply voltage covering the pp value of $E_3$ is enough in this embodiment. Accordingly, the power supply voltage can be reduced to a half of the prior art and power consumption can also be reduced to a half.

Although the quantitative detail calculation process is omitted here, in case the horizontal scanning frequency is defined as $f_H$, the pp value of $E_3$ shown in FIG. 13D can be reduced almost to a half of the pp value of $E_2$ shown in FIG. 13B by selecting a value of $C_1$ to satisfy the condition indicated by the following formula (series resonant condition of capacitor 96 and coil 93).

$$(2\pi f_H)^2 \cdot L_1 \cdot C_1 \div 1 \qquad (4)$$

In FIG. 12, a value of $R_2$ is selected so that the Q value of resonant circuit consisting of coil 93 ($L_1$), capacitor 96 ($C_1$) and resistor 97 ($R_2$) can be set to a value between about 0.5 and 10.

$$Q = R_2 \cdot \sqrt{\frac{C_1}{L_1}} = 0.5 \sim 10 \qquad (5)$$

where, when the Q value is too small, the capacitor 96 ($C_1$) loses its function. When the Q value is too large, a little DC current generates a large potential difference between both ends of the resistor 97 ($R_2$) and attenuates the dynamic range of power amplifier 92.

Accordingly, this embodiment can be said to be effective in such a case that a large amount of compensation is not required for the DC or low frequency range.

Next, a system which is just suitable for large amount compensation required in the DC and low frequency region will be explained.

Figure 14:
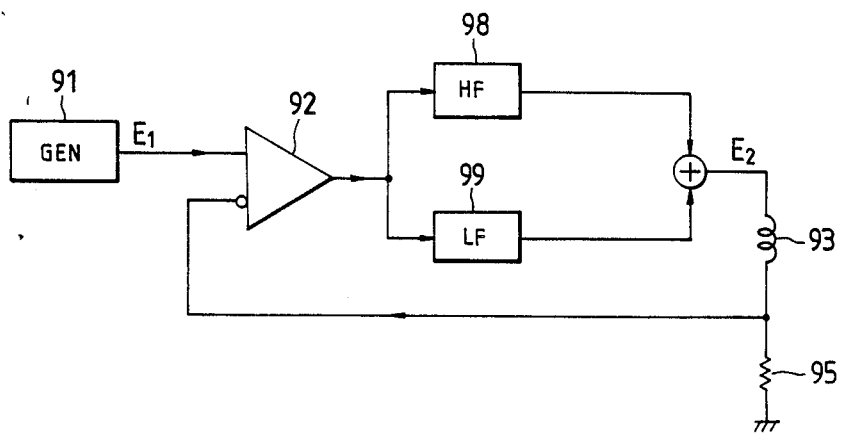
FIG. 14 is a block diagram of the basic structure of a convergence circuit by the present invention in case a large scale compensation is necessary for DC or low frequency region.

The concept of this system will be first shown in FIG. 14. 91, 92, 93, 95 in this figure correspond to the elements given the same reference numerals in FIG. 12. Moreover, 98 designates high frequency matching circuit (HF). 99, low frequency matching circuit (LF).

A problem in the structure shown in FIG. 12, namely insufficient dynamic range of power amplifier 92 for low frequency component may be solved by changing the power supply voltage or impedance level by means of the matching circuits 98, 99 shown FIG. 14.

Figure 15:
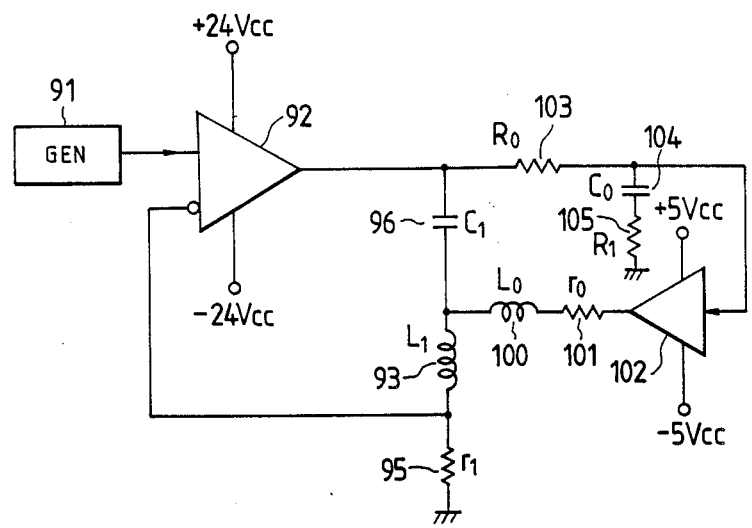
FIG. 15 is an circuit diagram showing a eighth embodiment of the present invention.

FIG. 15 shows an eighth embodiment of the present invention based on the concept shown in FIG. 14.

In FIG. 15, 91, 92, 93, 95, 96 correspond to those in FIG. 12. In addition, the capacitor 96 corresponds to the high frequency matching circuit 98 in FIG. 14 and the choke coil 100, resistor 101, small size power amplifier 102, resistor 103, capacitor 104 and resistor 105 correspond to the low frequency matching circuit 99.

Practical value examples when the elements 93, 96, 95, 100, 101, 103, 104 and 105 are given respective values, $L_1$, $C_1$, $r_1$, $L_0$, $r_0$, $R_0$, $C_0$, $R_1$ will be indicated below.

$L_1 = 30$ μH, $C_1 = 0.3$ μF, $r_1 = 1 \Omega$,
$L_0 = 300$ μH, $r_0 = 3 \Omega$, $R_0 = 1$ k$\Omega$,
$C_0 = 0.1$ μF, $R_1 = 100 \Omega$, Voltage gain of power amplifier 102 is about x1.0. Voltage gain of power amplifier 92 is about x100. Operations of the circuit in FIG. 15 are explained hereunder.

A high frequency current flows into the inductance $L_1$ of coil 93 through the capacitor 96 ($C_1$). In this case, since the choke coil 100 ($L_0$) has a high impedance, a branching loss to the choke coil 100 ($L_0$) is small.

Next, currents of DC component and low frequency component are filtered by a low-pass filter consisting of resistor 103 ($R_0$), capacitor 104 ($C_0$) and resistor 105 ($R_1$) and then supplied to the coil 93 ($L_1$) through the resistor 101 ($r_0$), choke coil 100 ($L_0$) via a small size power amplifier 102 using a low voltage power supply (+5 V). Here, the resistor 101 ($r_0$) connected in series to the choke coil 100 ($L_0$) indicates a loss of choke coil 100 ($L_0$) itself. Since the impedance of capacitor 96 ($C_1$) is high for the low frequency signal, the currents of DC and low frequency component show small branching loss in the direction toward the capacitor 96 ($C_1$).

In FIG. 15, the low-pass filter consisting of the resistor 103 ($R_0$), capacitor 104 ($C_0$) and resistor 105 ($R_1$) is provided for attenuating high frequency component. The resistor 105 ($R_1$) prevents a loop from hunting due to excessive delay by feedback loop. Although not shown in FIG. 15, it is effective to further add series connected elements of capacitor of 5 muF and resistor of 3 kΩ in parallel across the resistor 13 ($R_0$).

The low frequency component branching effect which is particular to this embodiment is as follows.

In the prior art, power loss has been about 12 W for supply of current of about 0.5A to the power amplifier 92 from a 24 V power supply, but in this embodiment, the power loss may be reduced by about 2.5 W since the current may be supplied from a 5 V power supply of small size power amplifier 102.

Figure 16:
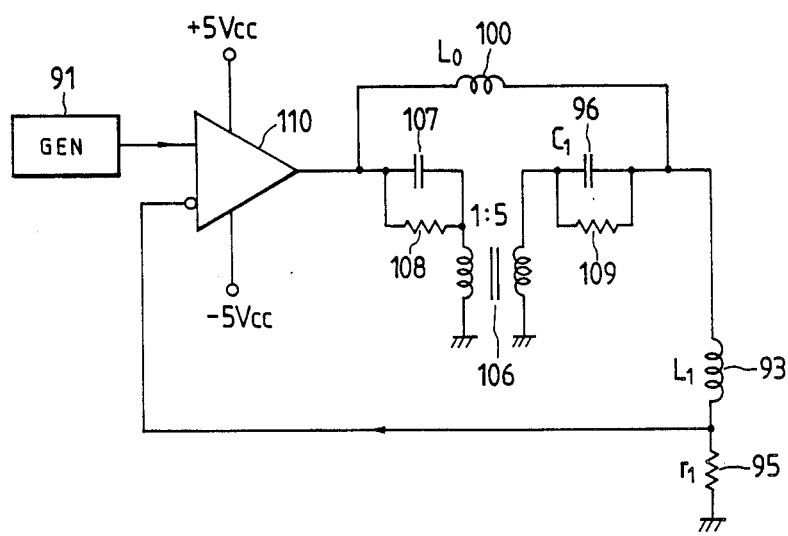
FIG. 16 is a circuit diagram showing a ninth embodiment of the present invention.

FIG. 16 shows a ninth embodiment of the present invention.

In FIG. 16, 91 93, 95, 96 and 100 are same as those in FIG. 15. Moreover, in this embodiment is used a power amplifier 110 of ±5 V power supply. But, in this case, the voltage amplitude becomes insufficient and a turn ratio is set to 1:5 with the transformer 106 to step up the voltage to about 5 times.

The capacitor 96 ($C_1$) and capacitor 107 allow the high frequency current to pass through the transformer 106 provided between them and supply the current to the coil 93. Moreover, resistors 108, 109 connected in parallel thereto are provided for avoiding loop hunting in the intermediate frequency range and has the same object as the resistor 105 shown in FIG. 15.

The low frequency current is supplied to the coil 93 through the choke coil 100 ($L_0$).

Examples of practical values are as follows in case the horizontal scanning frequency is 53 kHz.

$L_1 = 30$ μH, $r_1 = 1Ω$, $C_1 = 0.3$ μF,
Resistor 109: 30Ω, $L_0 = 300$ μH,
Capacitor 107: 8 μF, resistor 108: 800Ω,
Secondary side excitation inductance of transformer 106: 150 μH,
Primary side excitation inductance of transformer 106: 6 μH,
Voltage gain of power amplifier 110 is about x100.

As the convergence compensating coil 93, a deflection yoke (DY) or convergence yoke (CY) is used.

The effect of this embodiment is almost the same as that of eighth embodiment in FIG. 8 described previously but in this embodiment is used the transformer 106 in place of an additional power supply.

In each embodiment, the convergence circuit of only one channel has been explained. Actually, the convergence circuits of at least four channels, namely, the red color for right and left, upper and lower, while the blue for right and left, upper and lower, must be used. Accordingly, power consumption reduction effect is about 40 W in the seventh embodiment and about 80 W in total in the eighth or ninth embodiment.

Moreover, the present invention has been disclosed in above explanation as an apparatus to be applied to a projection type display but it can also be effectively applied to the direct viewing tube type super high precision display.

In the case of an ordinary television system, the horizontal scanning frequency is as low as about 16 kHz and it is comparatively close to the upper limitation of about 2 kHz of the harmonics of vertical scanning frequency. Therefore, it is a little difficult to apply the apparatus of this invention to such a television system but the present invention can easily be applied to a high precision television using the horizontal scanning frequency of about 32 kHz or higher and a high precision display system.

According to the present invention, since miss convergence between three primary colors resulting from a projection type optical system can be compensated by DY having excellent deflection sensitivity about twofold of that of CY, the power to be consumed by compensation may be reduced almost to a half of the prior art, realizing economization. In addition, since power consumption may be reduced almost to a half, the heat generated by power consumption may also be reduced to a half. Accordingly, internal temperature of a projection type display can be reduced and reliability can also be improved.

What is claimed is:

1. A miss convergence compensating apparatus for projection type display comprising a plurality of deflection coils for deflecting electron beams at a plurality of projection tubes emitting monochrome beams, deflection circuits to flow deflection currents to said deflection coils, a miss convergence compensating signal generating means which generates a miss convergence compensating signal and a transformer coupling means which receives an output signal from said generating means and flows a compensating current corresponding to said output signal to at least two deflection coils among said plurality of deflection coils, said transformer coupling means being coupled to allow currents of the same magnitude and opposite polarity to flow as the compensating currents at least into the two deflection coils.

2. An apparatus according to claim 1, wherein said miss convergence compensating signal generating means comprises a first means for generating a sawtooth wave signal of one vertical scanning period, a second means for generating a sawtooth wave signal of one horizontal scanning period and a multiplying mean for multiplying sawtooth wave signals from both said first and second means by each other.

3. An apparatus according to claim 1, wherein said miss convergence compensating signal generating means comprises a first means for generating the sawtooth wave signal of one vertical scanning period, a second means for generating a pulse signal of one horizontal scanning period and a means for multiplying the signals from both said first and second means by each other.

4. An apparatus according to claim 2 or 3, wherein said deflection coil is a vertical deflection coil.

5. An apparatus according to claim 1, wherein said miss convergence compensating signal generating means comprises a means for generating the signal obtained by squaring the sawtooth wave signal of one horizontal scanning period, a means for holding the maximum value of said squared signal and a changeover means for selectively outputting an output of said holding means during the horizontal flyback time and selectively outputting the squared signal during other periods.

6. An apparatus according to claim 5, wherein said deflection coil is a horizontal deflection coil.

7. An apparatus according to claim 1, wherein said projection tubes have three colors of red, green and blue, the miss convergence compensating signal generating means comprises a first means for generating a signal which shifts in parallel the red image in the horizontal direction in reference to the green image and a second means for generating a signal which shifts in parallel the blue image in the horizontal direction in reference to the green image, the deflection coil for green and deflection coil for red are driven differentially with an output signal of the first means, and the deflection coil for green and the deflection coil for blue are driven differentially with an output signal of the second means.

8. An apparatus according to claim 1, wherein said projection tubes have three colors of red, green and blue, the miss convergence compensating signal generating means comprises a first means for generating a signal which shifts in parallel the red image in the vertical direction in reference to the green image and a second means for generating a signal which shifts in parallel the blue image in the vertical direction in reference to the green image, the deflection coil for green and deflection coil for red are driven differentially with an output signal of the first means, and the deflection coil for green and the deflection coil for blue are driven differentially with an output signal of the second means.

9. An apparatus according to claim 1, further comprising a power amplifying means provided between the miss convergence compensating signal generating means and a miss convergence compensating coil and amplifying an output signal of the miss convergence compensating signal generating means, and a high frequency matching circuit which receives the signal output from the power amplifying means and permits only high frequency components including at least a horizontal scanning frequency component included in said signal output to pass in order to supply said high frequency components to the miss convergence compensating coil.

10. An apparatus according to claim 9, wherein the high frequency matching circuit comprises a high pass capacitor.

11. An apparatus according to claim 9, further comprising, in parallel with the high frequency matching circuit, a low frequency matching circuit which receives the signal output from the power amplifying means and permits a low frequency component including at least a DC component to pass in order to supply said low frequency component to the miss convergence compensating coil.

12. An apparatus according to claim 11, wherein said low frequency matching circuit comprises a low-pass filter, a power amplifier for amplifying a low frequency signal which has passed the low-pass filter and a choke coil connected to the output of the power amplifier.

13. An apparatus according to claim 9, wherein said power amplifying means is a low-voltage driven power amplifier, has a transformer which increases an output signal voltage of the power amplifying means and supplies an output of the transformer to the high frequency matching circuit.

14. A miss convergence compensating apparatus comprising a miss convergence compensating signal generating means for generating a miss convergence compensating signal, a miss convergence compensating coil, power amplifying means provided between the miss convergence compensating signal generating means and the miss convergence compensating coil for amplifying an output signal of the miss convergence compensating signal generating means, and a high frequency matching circuit for receiving the signal output from the power amplifying means and enabling only high frequency components including at least a horizontal scanning frequency component included in the signal output from the power amplifying means to pass in order to supply the high frequency components to the miss convergence compensating coil.

15. An apparatus according to claim 14, wherein the high frequency matching circuit comprises a high-pass capacitor.

16. An apparatus according to claim 14, further comprising a low frequency matching circuit in parallel with the high frequency matching circuit for receiving the signal output from the power amplifying means and enabling a low frequency component including at least a DC component to pass in order to supply the low frequency component to the miss convergence compensating coil.

17. An apparatus according to claim 16, wherein the low frequency matching circuit includes a low-pass filter, a power amplifier for amplifying a low frequency signal which has passed the low-pass filter and a choke coil connected to the output of the power amplifier.

18. An apparatus according to claim 14, wherein the power amplifying means is a low-voltage driven power amplifier and includes a transformer for increasing an output signal voltage of the power amplifying means for supplying an output of the transformer to the high frequency matching circuit.

* * * * *